Patented Dec. 7, 1948

2,455,687

UNITED STATES PATENT OFFICE

2,455,687

CUPRAMMONIACAL PETROLEUM MAHOGANY SULFONATES

Leo Liberthson, New York, N. Y., assignor to L. Sonneborn Sons, Inc., a corporation of Delaware No Drawing. Application April 12, 1945, Serial No. 588,069

5 Claims. (Cl. 260—438)

1

This invention relates to new and useful cuprammoniacal petroleum mahogany sulfonates.

One object of the invention comprises inter alia a new and useful fungicide and insecticide.

Another object of the invention comprises such fungicide and insecticide which is substantially soluble in organic solvents and specifically hydrocarbon oils.

Another object of the invention comprises such fungicide and insecticide which when in organic solvent solution, and particularly in hydrocarbon oil solution, renders the solution spontaneously emulsifiable in aqueous media without the necessity of adding an emulsifying or dispersing agent.

The novel fungicide and insecticide in accordance with the invention is cuprammoniacal petroleum mahogany sulfonate having an ammoniacal component being at least one member selected from the group consisting of ammonia and organic substituted ammonia products. My novel fungicide and insecticide compounds preferably correspond substantially to the following general formula $$[Cu(Amm)_x](RSO_3)_2$$

in which $RSO_3$ designates a petroleum mahogany sulfonate radical in which $Amm$ designates a member of the group of ammoniacal compounds consisting of $NH_3$ and aliphatic and mixed aliphatic-aromatic, aliphatic-heterocyclic, primary-, secondary-, and tertiary amines, carbocyclic and heterocyclic primary and secondary amines and heterocyclic compounds with an N in ring chain configuration, and in which $x$ designates the number of ammoniacal groups present, $x$ being preferably four.

The cuprammoniacal petroleum mahogany sulfonates in accordance with the invention which have an ammoniacal group of the ring N heterocyclic type, such as pyridine, quinoline or the like, are characterized by a relatively unpleasant pungent odor. This constitutes for many insecticide and fungicide applications a serious objection. The preferred product in accordance with my invention therefore is one substantially free from objectionable odor and substantially corresponds to the general formula $$[Cu(NR^1{}_3)_4](RSO_3)_2$$

in which $RSO_3$ designates a petroleum mahogany sulfonate radical and in which $NR^1{}_3$ designates a member of the group of ammoniacal products consisting of $NH_3$ and organic ammoniacal compounds derived from $NH_3$ by the substitution of at least one of the H atoms of the $NH_3$ by an organic radical.

2

The products in accordance with my invention may be obtained by reacting an alkali metal- and preferably sodium mahogany petroleum sulfonate with a water-soluble copper salt, such as copper sulphate, copper acetate, copper chloride, copper nitrate, in the presence of ammonia, either in gaseous form or as an aqueous solution, or in the presence of any organic ammonia substitute. Suitable organic ammonia substitutes are for instance water-soluble aliphatic amines of the alkylamine, alkylolamine, alkylene polyamine types, or, oil-soluble aromatic amines, both carbocyclic and heterocyclic, of the ring H substituted type. The amounts required for the interaction of any given amine, alkali metal petroleum mahogany sulfonate and water-soluble copper salt are within the range which is stoichiometrically necessary in accordance with the above formula to lead to the formation of the cuprammoniacal petroleum mahogany sulfonates in accordance with the invention.

Alternatively, I may obtain the cuprammoniacal petroleum mahogany sulfonates in accordance with the invention by reacting the ammonia or organic substituted ammonia product with a preformed copper mahogany sulfonate. By way of still further alternative, I may first react the aqueous copper salt solution with ammonia or organic ammonia substitute to form the complex copper ammoniacal compound and thereafter react this with petroleum mahogany sulfonate. In any case, the course of the reaction and formation of the final product is indicated by the development of the deep blue to deep green color, depending on the particular ammonia compound used. In the case of the aromatic oil-soluble organic amines, the preferred procedure is to dissolve these amines first in alkali- such as sodium-petroleum mahogany sulfonate stock and then react this solution with the aqueous copper salt solution. After the reaction is complete, as indicated by the maximum color development, the reaction mixture is allowed to stand to permit separation of the aqueous sodium sulphate layer. Such settling is facilitated by maintaining the reaction mixture at about 150 to 180° F. overnight. After withdrawal of the lower aqueous sodium sulphate layer, the upper layer is heated and blown with air at about 220° F. in order to expel retained moisture. The products in accordance with the invention are distinguished by a characteristic color ranging from dark green or greenish blue to a dark true blue.

By way of ammoniacal compound that I may use in the preparation of the products in accordance with my invention, I have found it possible to use any primary, secondary or tertiary amino compound characterized by a sufficient basicity of any $NH_2$ NH or N group present to be capable of entering into the formation of a cuprammoniacal complex compound when in contact with a copper salt. Representative of suitable amino compounds are thus for instance, normal and isopropylamine, normal and isoamylamine, normal and isohexylamine, mono- di- and triethanol amines, propanolamine, aniline, dimethylaniline, toluidine, xylidine, morpholine, pyridine and quinoline.

When compounding the products in accordance with my invention, I may use petroleum mahogany sulfonates either as such or in their solution in what is commonly termed retained oil. Petroleum mahogany sulfonates are obtained in the refining of petroleum hydrocarbon distillates with fuming sulfuric acid under sulfonating conditions of acid concentration, amount and temperature. After the acid treatment and the withdrawal of the lower layer acid sludge, the upper refined oil layer contains substantially dissolved therein a series of closely related sulfonic acids conventionally termed petroleum mahogany sulfonic acids which are recovered therefrom in the form of their sulfonates after neutralization and a suitable extraction procedure. The recovered petroleum mahogany sulfonates, however, carry usually with them through the extraction step between 25 and 50, and usually about 35%, of the oil from the oil layer in which they were carried. It is this oil, relatively tenaciously held by the petroleum mahogany sulfonates, that is usually referred to in the art as retained oil.

The following examples are furnished by way of illustration and not of limitation.

Example 1

To a solution of $CuSO_4.5H_2O$ in 500 cc. of water was added 56 grams of 26° ammonia. The resulting deep blue solution of cuprammonium hydroxide was added to a hot aqueous dispersion of 150 grams commercial mahogany sodium sulfonate containing 65% sulfonates, dry basis, with thorough agitation. The mixture was allowed to settle over night and the lower aqueous salt layer was siphoned off. The upper layer was dehydrated by blowing with warm air. A deep azure blue viscous product was obtained having complete oil solubility at normal temperatures. By contrast, copper mahogany sulfonates require high temperatures to drive into oil solution and the resulting solution is highly unstable precipitating the copper sulfonate on cooling.

Example 2

100 grams of dry oil free mahogany sodium sulfonate were dispersed in 1 liter of hot water and 60 grams of commercial triethanolamine added to the dispersion with thorough agitation. A solution of 25 grams of $CuSO_4.5H_2O$ in 500 cc. of water was then added to the above prepared alkaline dispersion under constant agitation. Upon cooling the copper triethanolamine mahogany sulfonate coagulated to a viscous deep bluish green product. The aqueous liquor was drawn off and the sulfonate taken up with a light refined petroleum distillate in amount sufficient to give a 50% solution of copper triethanolamine sulfonates. This solution was blown with warm air to dehydrate.

Example 3

150 grams of commercial petroleum mahogany sulfonates were dispersed in 1 liter of hot water. To this dispersion, under constant agitation, was added a solution of 25 grams $CuSO_4.5H_2O$ in 500 cc. of water. The mixture was allowed to stratify and the lower aqueous salt layer was drawn off. To the remaining oil layer containing the copper mahogany sulfonate was added 56 grams of 26° ammonia. This converted the relatively colorless copper mahogany sulfonate to the deep blue product of Example 1.

Example 4

To 150 grams of commercial petroleum mahogany sulfonate containing 65% of sulfonates of dry basis, was added 37.2 grams of aniline. This mixture was then dispersed in 1 liter of hot water and while under constant agitation, a solution of 25 grams of $CuSO_4.5H_2O$ in 500 cc. of water was added while stirring was maintained. The reaction mixture was then allowed to stratify and the lower aqueous salt layer drawn off and the upper layer blown with warm air to remove moisture. A deep green viscous product was obtained completely soluble in hydrocarbon solvents and oils.

Example 5

Following the procedure and quantity specified in Example 1, 34.8 grams of morpholine was substituted for the ammonia. The recovered copper morpholine mahogany sulfonate was substantially similar to the copper triethanolamine sulfonates obtained in Example 2, both as to color and solubility characteristics.

Example 6

Following the procedure of Example 4, 31.6 grams of pyridine were used instead of the aniline. The product obtained was similar to that obtained in Example 4; however, it was characterized by the unpleasant odor of pyridine.

Example 7

Following the procedure as specified under Example 2, 90.8 grams of tertiary isoamylamine were used instead of the triethanolamine. The product obtained exhibited the same deep blue green color characteristic of the organic cupramino mahogany sulfonate and similar solubility characteristics.

Example 8

Following the procedure of Example 1, the copper sulfate solution was first converted to the corresponding amino complex with aminoethanol of which 24.4 grams was required for the reaction. The final product obtained was similar to that obtained in Example 2, both as to color and solubility characteristics.

The foregoing description is for purposes of illustration and not of limitation and it is therefore my intention that the invention be limited only by the appended claims or their equivalents wherein I have endeavored to claim broadly all inherent novelty.

I claim:

1. A novel fungicide and insecticide substantially consisting of a cuprammoniacal petroleum mahogany sulfonate substantially of the general formula $$[Cu(Amm)_x](RSO_3)_2$$

in which $RSO_3$ designates a petroleum mahogany sulfonate radical, in which $Amm$ designates an ammoniacal compound capable of entering into the formation of a cuprammoniacal complex compound when in contact with a copper salt, and in which $x$ designates the number of A$mm$ groups.

2. A novel fungicide and insecticide in accordance with claim 1 in which $x$ is four in number.

3. A novel fungicide and insecticide in accordance with claim 2 in which said ammoniacal compound is an aliphatic amine of the water soluble type.

4. A novel fungicide and insecticide in accordance with claim 2 in which said ammoniacal compound is a substantially oil-soluble aromatic amine.

5. A novel fungicide and insecticide in accordance with claim 2 in which said ammoniacal compound is NH$_3$.

LEO LIBERTHSON.

REFERENCES CITED

The following references are of record in the file of this patent:

UNITED STATES PATENTS

| Number | Name | Date |
| --- | --- | --- |
| 1,947,652 | Langedijk | Feb. 20, 1934 |
| 2,110,608 | Moore et al. | Mar. 8, 1938 |
| 2,364,391 | Schiller | Dec. 5, 1944 |
| 2,423,619 | Roon | July 8, 1947 |